US008834602B2

(12) United States Patent
Clark et al.

(10) Patent No.: US 8,834,602 B2
(45) Date of Patent: *Sep. 16, 2014

(54) PROCESS FOR TREATING PARTICULATE MATERIAL CONTAINING HEAVY METAL AND AN ADDITIVE FOR USE IN SUCH PROCESS

(75) Inventors: Redmond R. Clark, Lake Barrington, IL (US); James A. Lively, Lindenhust, IL (US); Christopher D. Scott, Crystal Lake, IL (US)

(73) Assignee: CBL Industrial Services, Inc., Cary, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/324,813

(22) Filed: Dec. 13, 2011

(65) Prior Publication Data
US 2012/0190908 A1    Jul. 26, 2012

Related U.S. Application Data

(63) Continuation of application No. 11/743,959, filed on May 3, 2007, now Pat. No. 8,075,666.

(51) Int. Cl.
*C22B 1/243*    (2006.01)
*C22B 7/02*    (2006.01)
*A62D 3/30*    (2007.01)

(52) U.S. Cl.
CPC .. *C22B 7/02* (2013.01); *C22B 1/243* (2013.01)
USPC ............................... 75/773; 588/313; 588/404

(58) Field of Classification Search
USPC .................. 75/773; 588/3, 4, 9, 257
See application file for complete search history.

(56) References Cited

U.S. PATENT DOCUMENTS

| 4,555,392 A | 11/1985 | Steinberg |
| 4,878,944 A | 11/1989 | Rolle et al. |
| 5,997,629 A | 12/1999 | Hills |

(Continued)

FOREIGN PATENT DOCUMENTS

| EP | 0801971 | 10/1997 |
| GB | 2217314 | 10/1989 |

(Continued)

OTHER PUBLICATIONS

International Preliminary Report on Patentability for International Patent Application No. PCT/US2008/062372, mailed Nov. 12, 2009.

(Continued)

*Primary Examiner* — George Wyszomierski
*Assistant Examiner* — Ngoclan T Mai
(74) *Attorney, Agent, or Firm* — McAndrews, Held & Malloy Ltd.

(57) ABSTRACT

A process for treating particulate material containing heavy metal generated during a manufacturing process is disclosed. The process includes providing particulate material containing heavy metal within an enclosed area and mixing an additive of calcium silicate forming material with the particulate material in the enclosed area to create an additive-particulate material. The additive-particulate material can be passed into a waste collection device located downstream of the enclosed area. The calcium silicate forming material can be provided as particles with a particle size of minus 50 to plus 325 mesh. An additional aspect of the invention is an additive for use in such a process for treating metallic oxide impregnated dust, which has a particle size of plus 325 mesh and consists essentially of calcium silicate forming material.

23 Claims, 1 Drawing Sheet

(56) References Cited

U.S. PATENT DOCUMENTS

| | | |
|---|---|---|
| 6,403,050 B1 | 6/2002 | Maeno et al. |
| 6,416,251 B1 | 7/2002 | Nayak et al. |
| 6,676,911 B1 | 1/2004 | Yamamoto et al. |
| 7,247,601 B1 | 7/2007 | Hills et al. |

FOREIGN PATENT DOCUMENTS

| | | |
|---|---|---|
| JP | 06170162 | 6/1994 |
| JP | 09108647 | 4/1997 |
| JP | 2001149743 | 6/2001 |
| JP | 2001205047 | 7/2001 |
| WO | 88/10243 | 12/1988 |

OTHER PUBLICATIONS

International Search Report corresponding to International Application Serial No. PCT/US2008/062372, mailed Jul. 15, 2008, 6 pages.
Written Opinion of the International Searching Authority corresponding to International Application Serial No. PCT/US2008/062372, mailed Jul. 15, 2008, 7 pages.
Final Rejection in U.S. Appl. No. 11/743,959 dated Feb. 15, 2011.
Non-Final Rejection in U.S. Appl. No. 11/743,959 dated Jul. 2, 2010.
Non-Final Rejection in U.S. Appl. No. 11/743,959 dated Dec. 29, 2009.

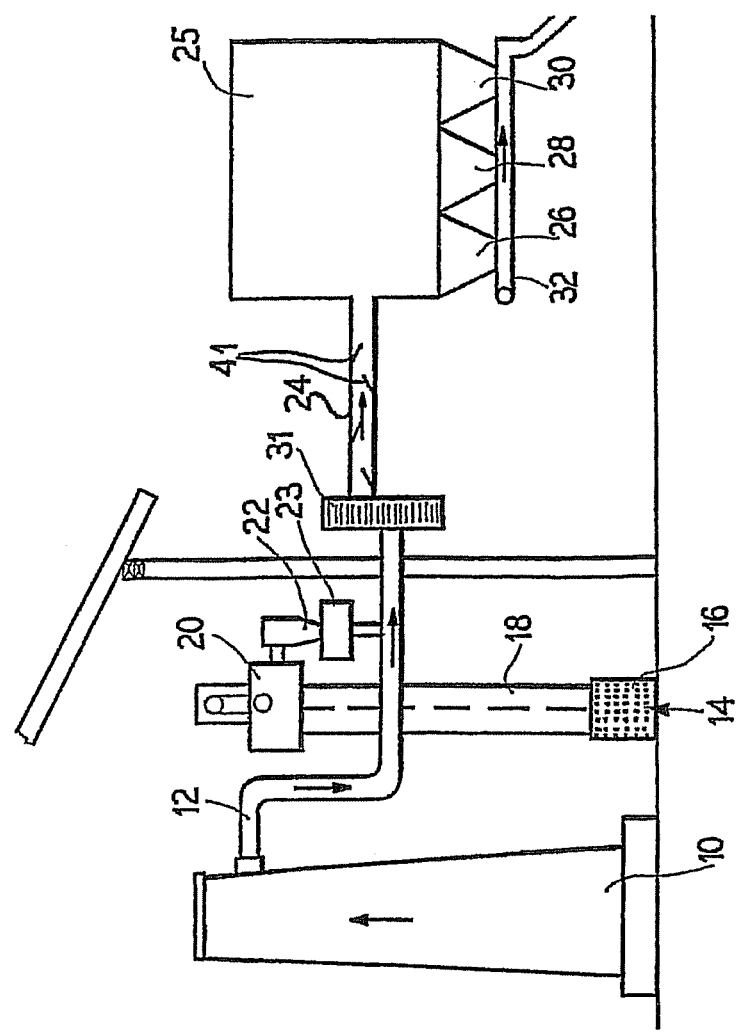

PROCESS FOR TREATING PARTICULATE MATERIAL CONTAINING HEAVY METAL AND AN ADDITIVE FOR USE IN SUCH PROCESS

CROSS-REFERENCE TO RELATED APPLICATIONS

The present application is a Continuation of U.S. non-provisional patent application Ser. No. 11/743,959, filed on May 3, 2007, entitled PROCESS FOR TREATING PARTICULATE MATERIAL CONTAINING HEAVY METAL AND AN ADDITIVE FOR USE IN SUCH PROCESS, now U.S. Pat. No. 8,075,666 issued on Dec. 13, 2011 and hereby incorporates herein by reference the complete subject matter thereof in its entirety.

STATEMENT REGARDING FEDERALLY SPONSORED RESEARCH OR DEVELOPMENT

Not applicable.

BACKGROUND

The present invention relates generally to methods for treating cupola and electric arc furnace dust and other waste materials generated during manufacturing processes. More specifically, the present invention relates to an environmentally acceptable closed system process for treating environmentally hazardous heavy metal oxides generated during ferrous metal and nonferrous scrap remelt operations.

Foundries use a range of melt technologies to produce liquid iron and steel for casting. The melt technologies used include cupolas, induction furnaces, and electric arc furnaces. Scrap metal is fed into the furnace or melt vessel and the metal is subjected to intense heat to induce melting. As a byproduct of that melting process, waste gases and particulates are generated and collected above the melt vessel.

Federal and state or provincial environmental regulations in the United States, Canada, and other countries require the collection of these solid and gaseous wastes as well as the removal of the particulate wastes before the exhaust is released to the atmosphere. (This application principally discusses United States Environmental Protection Agency ("EPA") regulations, but comparable regulations are applicable in individual states and other countries.) The device used to capture these wastes is any one of a series of filtering devices, most commonly called a bag house. The solid wastes collected by these filters are typically disposed in a landfill, either as a non-hazardous waste (US EPA Subtitle D wastes) or as a hazardous waste (US EPA Subtitle C wastes).

Disposal of hazardous waste often requires one or more types of waste treatment before disposal, and the management of these hazardous wastes is typically more expensive than non-hazardous wastes. Using EPA-developed extraction testing procedures, foundry bag house wastes that are hazardous usually have unacceptable levels of one or more RCRA-regulated heavy metals, including arsenic, barium, cadmium, chromium, lead, mercury, selenium and silver. Once these filter wastes are deemed hazardous, the US EPA requires that they be treated until the toxic metals in the waste meet a universal treatment standard (UTS) set for each hazardous heavy metal contaminant.

Foundries and other scrap remelt operations are regulated under the Solid Waste Disposal Act, as amended by the Resource Conservation and Recovery Act of 1976 and the Hazardous and Solid Waste amendments of 1984 (collectively "RCRA"). RCRA controls and regulates the collection of bag house dust and like hazardous wastes. If a system generates hazardous waste, then treatment of the hazardous waste requires a RCRA treatment permit prior to treatment of the waste for disposal. See, 40 CFR Section 261.4 (c).

The process of securing a RCRA permit can take up to one year and the applicant may incur a cost of up to $100,000.00. Therefore, if a more efficient process for treating metallic oxide impregnated dust within the manufacturing processing unit is used, treating the dust before it is classified as "waste" for regulatory purposes, a RCRA permit is not needed. This will result in a savings in of both time and money to the foundry operator.

Foundries purchase scrap iron and steel from a wide array of sources, and it is not uncommon for the scrap iron or steel to be somewhat contaminated by "tramp" RCRA 8 heavy metals. These heavy metals can come from any number of sources, including car batteries (lead), wheel balancing weights (lead), brass plumbing fixtures (lead) and plated metal surfaces (cadmium and chromium). When the iron and steel are melted, these tramp heavy metals also melt and then vaporize, since their vaporization point is lower than the melting point of iron and steel. The heavy metal gases leave the melting chamber with the exhausted gas and particulates, and as they cool, the heavy metals re-form as metal oxide particulate and end up in the bag house dust collected from the melt process. Since these oxides tend to be toxic and environmentally mobile, federal and state regulatory authorities want the wastes segregated and treated before disposal.

Typically, the bag house dust contains a variety of types of metallic oxide particles including RCRA 8 toxic heavy metals in sufficiently high concentrations to be classified as hazardous by the US Environmental Protection Agency and its state counterparts. Because this bag house dust is generated by subjecting scrap metal to high temperatures, the dust contains oxides and is extremely dry.

Typical foundry furnace bag house dusts can include oxides of the following component metals:

| Component | Weight Percent |
| --- | --- |
| Iron | 15-18 percent |
| Manganese | 2 percent |
| Nickel | less than 1 percent |
| Lead | 2-6 percent |
| Cadmium | 1-2 percent |
| Magnesium | 1-4 percent |
| Chromium | 1 percent |
| Zinc | 35-40 percent |
| Other | Balance |

Because this dust contains hazardous levels of regulated metallic oxides, it is necessary to treat the dust before disposal. To this end, prior art foundry processes have, for example, treated the dust by feeding the hazardous dust from the bag house to a feed silo that mixes the hazardous dust with an additive so that the dust can then be disposed of.

Over the past twenty years, several parties found that these wastes could be rendered non-hazardous by injecting chemicals into the furnace or into the exhaust ducts of the furnace. These chemicals commingled with the wastes during air transport, producing a non-hazardous waste in the bag house. After careful review, the US EPA and the state counterparts to the US EPA determined that this was an allowable part of the manufacturing process that would be exempt from the requirement that permits must be obtained for all hazardous waste treatment processes before use at a generator's site.

These processes included the injection of very fine calcium silicates combined with calcium sulfoaluminate, as well as the injection of various types of phosphates combined with magnesium oxide and/or calcium oxide (lime)-bearing compounds. These processes are disclosed in U.S. Pat. Nos. 4,878,944, 5,037,479, 6,857,998, U.S. Ser. No. 06/920,922, and Canadian Patent No. 1279876, each incorporated here by reference.

In the case of the finely ground calcium silicates combined with calcium sulfoaluminate, researchers found that injection of chemicals at rates of 15 to 20% by weight was effective in producing non-hazardous wastes under a wide range of regulated (RCRA 8) heavy metal contamination levels. This was and is an alternative method historically used at multiple foundry facilities over almost a two decade period of time. As an example, many of those foundries had lead and cadmium levels in the bag house dust that typically ranged from 2,700 ppm to 10,400 ppm for lead and 100 to 300 ppm for cadmium. This waste and a 15% to 20% by weight addition rate of blends of calcium silicates and calcium sulfoaluminates produced waste materials compliant with US EPA Subtitle D non-hazardous waste management standards. In the case of the phosphate admixtures, independent data suggests that addition rates of approximately 3% to 20% by weight were also successful in stabilizing RCRA 8 heavy metals and rendering wastes non-hazardous.

SUMMARY OF THE INVENTION

One aspect of the present invention provides an improved process for treating particulate material containing heavy metal oxides generated during a manufacturing process so that the treatment process is part of the manufacturing process unit and accordingly affords a closed or enclosed system. The process includes combining an additive consisting essentially of calcium silicate forming material with the particulate material containing regulated heavy metal oxides, optionally within an enclosed area, to create an additive-particulate material blend.

Another aspect of the invention further includes passing the additive-particulate material into a waste collection device. In an embodiment of the present invention, the waste collection device can be located downstream of the enclosed area.

In an embodiment of the present invention, the enclosed area can be a duct, and the additive is passed into the duct at a feed point. Further, a fin can be provided in the duct downstream of the feed point.

In a further embodiment of the present invention, the calcium silicate forming material comprises particles with a particle size of minus 50 to plus 325 mesh. Alternatively, the calcium silicate forming material comprises particles with a particle size of minus 100 to plus 300 mesh. Alternatively, the calcium silicate forming material comprises 40-50% by weight of particles with a particle sizes of minus 170 to plus 300 mesh.

In another embodiment of the present invention, the additive consisting essentially of calcium silicate forming material comprises particles having the following size fraction ranges:
  minus 50 to plus 60 mesh: 10-20% by weight
  minus 60 to plus 70 mesh: 5-15% by weight
  minus 70 to plus 80 mesh: 2-10% by weight
  minus 80 to plus 100 mesh: 5-15% by weight
  minus 100 to plus 140 mesh: 10-20% by weight
  minus 170 to plus 300 mesh: 40-50% by weight In an embodiment of the present invention the process for treating particulate material containing heavy metal generated during a manufacturing process includes feeding the calcium silicate forming material into the enclosed area by injecting the calcium silicate forming material through an injector unit. In one embodiment, the calcium silicate forming material is pneumatically fed into the injector unit. In another embodiment, the calcium silicate forming material is gravity-fed into the injector unit. In yet another embodiment of the present invention the calcium silicate forming material is fed from a dry material feeder into an injector. In still another embodiment of the present invention the calcium silicate forming material is suction-fed from a dry material feeder through a branch line into the process duct, using the venturi effect caused by the flow of gas through the process duct.

Another aspect of the invention is a process for treating and collecting heavy metal contaminated dust generated during a manufacturing process. The process includes passing particulate material through at least one enclosed area and toward a waste collection device, feeding an additive comprising calcium silicate forming material with a particle size of minus 50 to plus 325 mesh into the enclosed area to be mixed with the particulate material to create an additive-particulate material upstream from the waste collection device; and passing the additive-particulate material mixture into the waste collection device.

Another aspect of the invention is a process for collecting and pre-treating metallic oxide impregnated dust generated in a manufacturing unit during a manufacturing process. The process includes passing metallic oxide impregnated dust in an air or fluid stream from an industrial process to a waste generation point and a waste collection device, injecting an additive consisting essentially of calcium silicate forming material into the metallic oxide impregnated dust stream generated by the industrial process at a point upstream from the waste collection device, and collecting the blended metallic oxide impregnated dust and calcium silicate forming material in a waste collection device.

Another aspect of the invention is an additive for use in a process for treating metallic oxide impregnated dust, wherein the additive has a particle size of plus 325 mesh and consists essentially of a calcium silicate forming material.

A material comprising minus 50 to plus 325 mesh calcium silicate forming material is also provided.

Accordingly, it is an advantage of the present invention to provide a process for treating particulate material generated during a manufacturing process that is part of the manufacturing process so as to either afford an enclosed system as that term is defined by the Environmental Protection Agency or to add admixtures before the exhaust is considered to be a generated solid waste as that term is defined by the Environmental Protection Agency or its state counterparts.

In certain embodiments, the new method can sharply reduce the amounts of silicates required to render these wastes non-hazardous.

Additional features and advantages of the present invention are described in, and will be apparent from, the detailed description of the presently alternative embodiments and from the drawing.

"Consisting essentially of," with reference to an additive consisting essentially of particulate calcium silicate forming material, is defined here in part as containing less calcium sulfoaluminate in the calcium silicate forming material than is contained in Type I Portland cement.

BRIEF DESCRIPTION OF THE DRAWINGS

The FIGURE illustrates a schematic view of an embodiment of the process of the present invention.

DETAILED DESCRIPTION

While the invention will be described in connection with one or more embodiments, it will be understood that the invention is not limited to those embodiments. On the contrary, the invention includes all alternatives, modifications, and equivalents as may be included within the spirit and scope of the appended claims.

The present invention provides an improved process for treating environmentally hazardous metallic oxide impregnated dusts as well as other materials. More specifically, the present invention provides an improved method and additive for treating bag house dust, or other dust, that is generated during the scrap remelting process, in a manner so that the treatment process is either part of the manufacturing process. This results in a remelt process that is afforded the totally enclosed treatment exemption by the Environmental Protection Agency, or is not considered treatment at all if done before waste is produced according to the regulatory standard. To this end, pursuant to an embodiment of the method of the present invention, the treatment process can be located downstream from the cupola or other source of heavy metal waste but upstream from the bag house or other waste removal process or equipment. Although the present invention is directed specifically to scrap metal remelting processes, it should be appreciated that the method of the present invention can be utilized in other processes that generate heavy metal contaminated particulate wastes.

As previously stated, in an alternative embodiment, the present invention relates to foundry and steel industry scrap remelting processes. Specifically, in an alternative embodiment, the present invention relates to foundry processes that utilize scrap metal and thereby generate bag house dust. As used herein, the term "bag house dust" refers to particles generated during the melting of scrap metal in a furnace such as cupola or electric arc furnaces. This dust contains a variety of metal oxide particles including one or more of the RCRA 8 toxic heavy metals in sufficiently high concentrations so as to be classified as hazardous by the Environmental Protection Agency. Currently, the US Environmental Protection Agency and its state counterparts set mandated treatment levels required for disposal of those wastes. Required heavy metal treatment levels for those hazardous wastes are: arsenic 1.0 mg/l; barium, <21 mg/l; cadmium, <0.11 mg/l; chromium, <0.60 mg/l; lead, <0.75 mg/l; mercury, <0.025 mg/l; selenium <0.14 mg/l; and silver, <0.14 mg/l; Because metallic oxide dust or bag house dust generated in a foundry utilizing scrap metal often includes heavy metal oxides that exceed these levels, the dust must be treated and disposed of in a manner in accordance with the regulations and requirements of the Environmental Protection Agency and its state counterparts.

Referring now to the FIGURE, a schematic of an embodiment of the process of the present invention is illustrated. As illustrated, the foundry process of the present invention includes a cupola 10. As is typical in the foundry industry, the cupola 10 is a vertical cylindrical furnace for melting scrap metal for foundry use. The cupola 10 can be a coke fired furnace. However, any furnace known in the art can be utilized.

In use, metal, coke, and flux are fed into the cupola 10 onto a bed of coke, through which air is blown. The cupola 10 generates a gas that includes particulate matter including metallic oxide impregnated particles. Often, the metallic oxide particles include heavy metal oxides that exceed permissible toxicity levels set by the Environmental Protection Agency and its state counterparts. As indicated by the arrows, the gas and solids in this embodiment flow out of the cupola 10 through at least one duct 12.

An apparatus 14 for treating the metallic oxide impregnated dust present in the gas can be coupled to the duct 12 and functions to inject into the duct 12 an additive consisting essentially of particulate calcium silicate forming material that mixes in the dust stream. Other arrangements for introducing the calcium silicate forming material into the duct can also be used.

The calcium silicate forming material useful in this invention forms dicalcium silicates, tricalcium silicates, or a mixture of these materials upon contact with moisture during or after the contemplated process. A suitable calcium silicate forming material comprises a mixture of $SiO_2$ and $CaO$. Optional additional ingredients of the calcium silicate forming material are contemplated, including one or more of the following: $Al_2O_3$, $Fe_2O_3$, $MgO$, and $K_2O$.

The amount of $SiO_2$ in the calcium silicate forming material can be 5% to 70% by weight, alternatively 10% to 40% by weight, alternatively 15% to 30% by weight, alternatively 18 to 22% by weight.

The amount of $CaO$ in the calcium silicate forming material can be 15% to 95% by weight, alternatively 40% to 80% by weight, alternatively 50% to 70% by weight, alternatively 60 to 70% by weight.

The amount of $Al_2O_3$ in the calcium silicate forming material can be 0% to 30% by weight, alternatively 1% to 15% by weight, alternatively 2% to 10% by weight, alternatively 4 to 8% by weight.

The amount of $Fe_2O_3$ in the calcium silicate forming material can be 0% to 30% by weight, alternatively 0% to 15% by weight, alternatively 1% to 10% by weight, alternatively 2 to 5% by weight.

The amount of $MgO$ in the calcium silicate forming material can be 0% to 30% by weight, alternatively 0.2% to 15% by weight, alternatively 0.5% to 10% by weight, alternatively 1 to 5% by weight.

An example of a suitable calcium silicate forming material composition is

| | |
|---|---|
| $SiO_2$ | 19.46-21.56% |
| $Al_2O_3$ | 5.40-6.48% |
| $Fe_2O_3$ | 2.12-2.60% |
| $CaO$ | 62.61-65.25% |
| $MgO$ | 1.6-4.36% |
| $K_2O$ | 0.83-1.12% |

Once this material is wetted, the following composition is produced:

| | |
|---|---|
| Tri-Calcium Silicate | 51.5-70.7% |
| Di-Calcium Silicate | 2.9-22.7% |

The calcium silicate forming material does not require any calcium sulfoaluminate, and is therefore chemically distinct from Portland cement. It is preferably entirely free of calcium sulfoaluminate, although embodiments containing less calcium sulfoaluminate than Type I Portland cement are also contemplated.

The calcium silicate forming material is a binder forms calcium silicates and binds with the heavy metal oxides when the treated waste is contacted by water. Water may be added deliberately, or the treated waste can be disposed of while dry, and when environmental water such as rain or ground water comes into contact with the treated waste, it will bind the heavy metal oxides, preventing leaching of the heavy metals.

Preferably, the calcium silicate forming material has a pH of at least 8 and therefore, when it binds with the metallic oxide particles, it chemically stabilizes them. Accordingly, when the calcium silicate forming material and oxide particles are disposed of, the calcium silicate forming material prevents the metallic oxide particles from leaching out even when the mixture is subjected to a low pH solution such as acid rain.

The degree of waste treatment can be sufficient to reduce the proportion of one or more of the regulated heavy metals to below the maximum levels allowed for non-hazardous (RCRA Subtitle D) landfill disposal, alternatively sufficient to reduce the leachable proportion of one or more heavy metals to below the minimum amount that can be detected by the employed and US EPA-required test method.

In an embodiment of the present invention, the additive is comprised of particles of calcium silicate forming material ground to a particle size of minus 50 to plus 325 mesh, U.S. Standard Sieve Series. Alternatively, the calcium silicate forming material is comprised of particles with a particle size of minus 100 to plus 300 mesh. Alternatively, the calcium silicate forming material is comprised of particles with particle sizes of minus 170 to plus 300 mesh.

In one alternative embodiment, the calcium silicate forming material comprises particles having the following size fraction ranges:

minus 50 to plus 60 mesh: 10-20% by weight
minus 60 to plus 70 mesh: 5-15% by weight
minus 70 to plus 80 mesh: 2-10% by weight
minus 80 to plus 100 mesh: 5-15% by weight
minus 100 to plus 140 mesh: 10-20% by weight
minus 170 to plus 300 mesh: 40-50% by weight The apparatus 14 for treating the dust includes apparatus for introducing the calcium silicate forming material into the duct 12 and apparatus for delivering the calcium silicate forming material to the apparatus for injecting. To this end, in the embodiment of the present invention illustrated in the FIGURE, a bucket closed system elevator 16 is provided. The bucket 16 provides a container into which a charge of calcium silicate forming material is placed. An elevator 18 is provided that conveys the bucket 16 from ground level to a metering feeder and holding hopper 20. Although a bucket closed system elevator 16 is illustrated, any apparatus for conveying the material can be utilized.

The feeder 20 functions to feed the calcium silicate forming material to a fluidizer 22 and venturi eductor 23. The venturi eductor 23 functions to inject the calcium silicate forming material into the duct 12 and thereby into the gas and dust stream to unite and bind with the metallic oxide particles.

The feeder 20 can be a dry material feeder that has good volumetric metering accuracy. It has been found that a feeder available from AccuRate of Whitewater, Wis., such as the 604 AccuRate Dry Material Feeder, functions satisfactorily. This dry material feeder has a volumetric metering accuracy of approximately ±0.5 to 2 percent for most materials. Accordingly, the feeder 20 accurately feeds to the fluidizer 22 and venturi eductor 23, and thus to the gas in the duct 12, an appropriate amount of calcium silicate forming material. The feeder 20 can also be a gravity feeder, pneumatic feeder, or any other type of feeder known in the art. The amount of calcium silicate forming material used can be 1-20%, alternatively 1-15%, alternatively 1-10%, alternatively about 1-6%, alternatively about 1-5%, alternatively about 1-4%, alternatively about 1-3% by weight of the process material to be treated. The amount of treatment material can also be an amount determined to be effective to reduce the amount of leachable heavy metals, by the EPA test, to less than the maximum amounts permitted for non-hazardous waste.

As discussed above, the calcium silicate forming material is fed from the feeder 20 into a special fluidizer 22. The fluidizer 22 injects, through a venturi eductor 23, the calcium silicate forming material into the gas and dust stream. Preferably, the venturi eductor 23 can be activated by a solenoid valve. The venturi eductor 23 allows one to vary the air pressure at which the calcium silicate forming material is injected. Depending on the fluid flow through the conduit, it may be desirable to vary the air pressure at which the calcium silicate forming material is injected. It has been found that a fluidizer and venturi eductor available from Gustafson of Eden, Prairie, Minn., as Model Nos. FS 3400 and RX 1200, respectively functions satisfactorily. Once injected into the gas and dust stream, the calcium silicate forming material mixes with the particulate matter, and specifically binds with the metal oxide materials contained therein.

As is illustrated and disclosed, in one embodiment the calcium silicate forming material is added upstream of the bag house 25.

In an alternative embodiment, a closed system, as that term is defined by the Environmental Protection Agency, can be provided and the calcium silicate forming material can be combined with the material in the bag house 25 without the need for a treatment permit.

Although only one venturi eductor 23 is illustrated, it may be desirable to utilize two or more injectors or other material feed apparatus at various locations before the bag house.

A blower 31 is provided for urging the dust and gas from the duct 12 into a second duct 24 toward the bag house 25. If desired, the calcium silicate forming material can be injected by use of the blower 31. Also, if desired, the venturi eductor 23 can be located so that the calcium silicate forming material is injected after the blower 31 that conveys the mixture through another duct 24 into the bag house 25.

In an alternative embodiment illustrated, the duct 24 includes a plurality of fins 41 that direct and channel air flow and thereby assist in integrating the particles. As used herein, the term "fin 41" refers to adjustable plates that are placed in the duct 24. To this end, the fins 41 preferably are pivotably connected to an interior of the duct 24 so that they are adjustable. Although a plurality of fins are illustrated, it should be noted that a single fin can be utilized.

In the bag house 25, pretreated metal oxides and other particles are collected in collection bins 26, 28, and 30. Below the collection bins 26, 28, and 30, an auger 32 is located. The auger 32 functions to move the dust present in the gas and calcium silicate forming material to apparatus for disposing of the materials, which may be conventional.

Although in the alternative embodiment illustrated, the material and calcium silicate forming material are collected in a hopper, it should be noted that the material can be collected in some other manner, for example, in a mixing auger.

As illustrated in the FIGURE, the apparatus for treating 14 is located upstream from the bag house 25, therefore, the treatment process is part of the manufacturing process, so the treatment process is not restricted or licensed by the US EPA.

It should be understood that various changes and modifications to the presently alternative embodiments described herein will be apparent to those skilled in the art. Such changes and modifications can be made without departing from the spirit and scope of the present invention, and without diminishing its attendant advantages. It is thereby intended that such changes and modifications be covered by the appended claims.

Working examples illustrating applications of the invention are presented below.

EXAMPLE 1

A large foundry with a cupola melting technology generates very large volumes of hazardous bag house dust annually. This untreated dust has levels of lead that range from 2,600 ppm to over 5,700 ppm, and this same foundry has levels of cadmium that routinely exceed 100 ppm. The waste is routinely hazardous for both lead and cadmium, and as a result, the US EPA requires that the wastes meet Universal Treatment Standards (UTS) before disposal. When a sample of this untreated waste is subjected to EPA testing for these metals, the generator finds that the extractable cadmium is 1.2 mg/l (the EPA UTS level for cadmium is 0.11 mg/l). This means that the bag house wastes are hazardous under US EPA Subtitle C regulations.

When the wastes are subjected to a 6% by weight addition of Type I Portland cement, according to a previously known process, the extractable cadmium levels are measured at 0.73 mg/l, well above the UTS standard of 0.011 mg/l.

In a test according to the present invention, calcium silicate forming material was ground to meet the following size standard:
Minus 50 to plus 60 mesh: 10-20% by weight
Minus 60 to plus 70 mesh: 5-15% by weight
Minus 70 to plus 80 mesh: 2-10% by weight
Minus 80 to plus 100 mesh: 5-15% by weight
Minus 100 to plus 140 mesh: 10-20% by weight
Minus 140 to plus 170 mesh: 5-15% by weight
Minus 170 mesh to plus 300 mesh: 40-50% by weight No calcium sulfoaluminate was added. This is a significantly larger particle size range than is used in the manufacture of Portland cement, which is ground to a standard of 100% by weight -325 mesh. A split of the same waste sample referenced above was subjected to treatment application rate of 6% by weight. The cadmium levels were undetectable under the EPA testing procedure. (The limits of the EPA extraction testing procedure are 0.2 mg/l for lead and 0.030 mg/l for cadmium.)

Following this analysis, fifteen additional samples of the waste were collected over a two month period and subjected to a treatment application rate of 6% by weight of the same treatment material. In these samples, both the extractable lead and the cadmium levels were undetectable under the EPA extraction testing procedure.

EXAMPLE 2

A large foundry with an electric arc melting technology generates very large volumes of hazardous bag house dust annually. This untreated dust has levels of lead that range from 290 ppm to over 320 ppm. When these untreated wastes are subjected to EPA extraction testing for these metals, the extractable lead is 8.9 mg/l. These wastes are hazardous under US EPA Subtitle C waste management regulations, and must be treated to meet the UTS standard for lead before they can be disposed in a landfill. (The US EPA UTS requirement for lead is 0.75 mg/l).

When the wastes are subjected to a 6% by weight addition of Type I Portland cement (including calcium sulfoaluminate), according to a previous method of treatment, the extractable lead level is 4.1 mg/l, showing only a 54% by weight reduction from the untreated sample. This value exceeds the UTS lead threshold of 0.75 mg/l, indicating that it is not compliant with the waste disposal standard for lead-contaminated hazardous wastes The calcium silicate forming material was ground to meet the same size standard set forth in Example 1. No calcium sulfoaluminate was added.

A split of the same waste sample was subjected to a treatment application rate of 6% by weight. The measured extractable lead value was non-detectable (less than 0.2 mg/l) and compliant with the UTS lead threshold of 0.75 mg/l.

In both working examples above, the coarsely ground calcium silicate compound produced measurably better test results when compared to a similar addition rate of Portland cement. This also means that when compared to Portland cement, similar results were generated with the use of the coarsely ground calcium silicate forming material at a 60% by weight reduction in the admixture application rate, compared to the historic application weight for the prior material of about 15% by weight.

What is claimed is:

1. A process for treating particulate material containing heavy metal oxides generated during a manufacturing process comprising:
providing particulate material containing heavy metal; and
mixing particulate calcium silicate forming material with the particulate material containing heavy metal at a mixing site to create an additive-particulate material blend and wherein the calcium silicate forming material has a particle size of minus 50 to plus 325 mesh and contains less calcium sulfoaluminate than is contained in Type I Portland cement.

2. The process of claim 1, further comprising passing the additive-particulate material blend into a waste collection device.

3. The process of claim 2, where the waste collection device is located downstream of the mixing site.

4. The process of claim 1, where the particulate calcium silicate forming material is present in an amount effective to at least partially neutralize the particulate material containing heavy metal oxides.

5. The process of claim 1, wherein the particulate calcium silicate forming material comprises particles with a particle size of minus 100 to plus 300 mesh.

6. The process of claim 1, wherein the particulate calcium silicate forming material comprises 40-50% by weight of particles with a particle sizes of minus 170 to plus 300 mesh.

7. The process of claim 1, wherein the particulate calcium silicate forming material comprises particles having the following size fraction ranges:
minus 50 to plus 60 mesh: 10-20% by weight
minus 60 to plus 70 mesh: 5-15% by weight
minus 70 to plus 80 mesh: 2-10% by weight
minus 80 to plus 100 mesh: 5-15% by weight
minus 100 to plus 140 mesh: 10-20% by weight
minus 140 to plus 170 mesh: 5-15% by weight
minus 170 to plus 300 mesh: 40-50% by weight.

8. The process of claim 1, comprising feeding the particulate calcium silicate forming material into the mixing site by injecting the particulate calcium silicate forming material through an injector unit.

9. The process of claim 8, comprising pneumatically feeding the particulate calcium silicate forming material into the injector unit.

10. The process of claim 8, comprising gravity-feeding the particulate calcium silicate forming material into the injector unit.

11. The process of claim 8, comprising feeding the particulate calcium silicate forming material from a dry material metering feeder into the injector.

12. The process of claim 1 wherein the mixing site is a duct.

13. The process of claim 12, further comprising feeding the particulate calcium silicate forming material into the duct at a feed point.

14. The process of claim 13, wherein the mixing site is within the duct and the particulate calcium silicate forming material is suction fed from a dry material feeder through a branch line at the feed point into the process duct.

15. The process of claim 13, further comprising providing a fin in the duct downstream of the -feed point.

16. The process of claim 1, wherein the calcium silicate forming material is 5% to 70% by weight $SiO_2$.

17. The process of claim 1, wherein the calcium silicate forming material is 15% to 95% by weight CaO.

18. The process of claim 1, wherein the calcium silicate forming material is 0% to 30% by weight $Al_2O_3$.

19. The process of claim 1, wherein the calcium silicate forming material is 0% to 30% by weight $Fe_2O_3$.

20. The process of claim 1, wherein the calcium silicate forming material is 0% to 30% by weight MgO.

21. A process for treating and collecting heavy metal contaminated dust generated during a manufacturing process comprising:

passing particulate material through at least one enclosed area and toward a waste collection device;

feeding a particulate calcium silicate forming material comprising calcium silicate forming material with a particle size of minus 50 to plus 325 mesh into the enclosed area to be mixed with the particulate material to create an additive-particulate material, upstream from the waste collection device; and passing the additive-particulate material mixture into the waste collection device and wherein the calcium silicate forming material contains less calcium sulfoaluminate than is contained in Type I Portland cement.

22. A process for collecting and pre-treating metallic oxide impregnated dust, generated in a manufacturing unit during a manufacturing process, comprising the steps of:

passing metallic oxide impregnated dust in an air or fluid stream from an industrial process to a waste generation point and a waste collection device;

injecting a particulate material consisting essentially of calcium silicate forming material with a particle size of minus 50 to plus 325 mesh and into the metallic oxide impregnated dust stream generated by the industrial process at a point upstream from the waste collection device; and collecting the blended metallic oxide impregnated dust and particulate calcium silicate forming material in a waste collection device and wherein the calcium silicate forming material contains less calcium sulfoaluminate than is contained in Type I Portland cement.

23. The process of claim 22, wherein the particulate calcium silicate forming material forms di and tri-calcium silicates after exposure to water.

* * * * *